(12) United States Patent
Safaripour et al.

(10) Patent No.: US 12,007,466 B2
(45) Date of Patent: Jun. 11, 2024

(54) THREE-DIMENSIONAL AND FOUR-DIMENSIONAL MAPPING OF SPACE USING MICROWAVE AND MM-WAVE PARALLAX

(71) Applicant: GuRu Wireless, Inc., Pasadena, CA (US)

(72) Inventors: Amirreza Safaripour, Pasadena, CA (US); Behrooz Abiri, Pasadena, CA (US); Florian Bohn, Pasadena, CA (US); Seyed Ali Hajimiri, Pasadena, CA (US)

(73) Assignee: GuRu Wireless, Inc., Pasadena, CA (US)

( * ) Notice: Subject to any disclaimer, the term of this patent is extended or adjusted under 35 U.S.C. 154(b) by 659 days.

(21) Appl. No.: 16/240,649

(22) Filed: Jan. 4, 2019

(65) Prior Publication Data

US 2019/0204432 A1 Jul. 4, 2019

Related U.S. Application Data

(60) Provisional application No. 62/613,704, filed on Jan. 4, 2018.

(51) Int. Cl.
*G01S 13/50* (2006.01)
*G01S 7/282* (2006.01)
(Continued)

(52) U.S. Cl.
CPC ............ *G01S 13/505* (2013.01); *G01S 7/282* (2013.01); *G01S 13/48* (2013.01); *G01S 13/89* (2013.01)

(58) Field of Classification Search
CPC ........ G01S 13/505; G01S 7/282; G01S 13/48; G01S 13/89
(Continued)

(56) References Cited

U.S. PATENT DOCUMENTS 4,158,841 A * 6/1979 Wuchner ............... G01S 13/931
342/96
4,939,522 A * 7/1990 Newstead ............. G01S 5/0009
342/398
(Continued)

FOREIGN PATENT DOCUMENTS

JP 2009270863 A * 11/2009 ............. G01S 13/46
JP 2009270863 A 11/2009
(Continued)

OTHER PUBLICATIONS

Extended European Search Report dated Sep. 22, 2021 in EP Application No. 19736038.1.
(Continued)

*Primary Examiner* — Nuzhat Pervin
(74) *Attorney, Agent, or Firm* — Weaver Austin Villeneuve & Sampson LLP

(57) ABSTRACT

An object's distance is determined using either two RF transmitters and an RF receiver, or a two RF receivers and an RF transmitter. When using two RF transmitters, the direction of the first transmitter is changed until it reaches a first direction defined by a first angle at which the power of the RF signal—transmitted by the first transmitter—reflected off the object and received by the receiver reaches a maximum value. The direction of the second transmitter is also changed until it reaches a second direction defined by a second angle at which the power of the second RF signal—transmitted by the second transmitter—reflected off the object and received by the receiver reaches a maximum value. The distance between the object and the first transmitter is defined by the distance between the two transmitters, the second angle, and the difference between the first and second angles.

10 Claims, 8 Drawing Sheets

(51) Int. Cl.
  *G01S 13/48* (2006.01)
  *G01S 13/89* (2006.01)
(58) Field of Classification Search
  USPC .......................................................... 342/84
  See application file for complete search history.

(56) References Cited

U.S. PATENT DOCUMENTS

| | | | | |
|---|---|---|---|---|
| 5,917,443 | A * | 6/1999 | Takahara | G01S 7/4026 342/158 |
| 6,184,828 | B1 * | 2/2001 | Shoki | H01Q 3/26 342/372 |
| 6,714,156 | B1 * | 3/2004 | Ibrahim | G01S 7/4026 342/174 |
| 8,120,526 | B2 * | 2/2012 | Holder | G01S 5/0273 342/146 |
| 8,390,507 | B2 * | 3/2013 | Wintermantel | G01S 7/0233 342/70 |
| 8,436,763 | B2 * | 5/2013 | Wintermantel | G01S 7/0233 342/70 |
| 8,941,533 | B2 * | 1/2015 | Mizutani | G01S 13/32 342/368 |
| 9,500,745 | B2 * | 11/2016 | Binzer | G01S 13/931 |
| 10,473,775 | B2 * | 11/2019 | Slemp | H01Q 3/04 |
| 10,502,826 | B2 * | 12/2019 | Tasovac | G01S 13/878 |
| 10,809,375 | B1 * | 10/2020 | Dana | G01S 13/953 |
| 11,493,628 | B1 * | 11/2022 | Parodi | G01S 15/42 |
| 11,693,104 | B2 * | 7/2023 | Lien | G01S 7/412 342/157 |
| 2005/0270229 | A1 * | 12/2005 | Stephens | G01S 7/42 342/146 |
| 2006/0158369 | A1 * | 7/2006 | Shinoda | H01Q 3/06 342/146 |
| 2009/0040099 | A1 * | 2/2009 | Young | G01S 13/867 342/179 |
| 2009/0167607 | A1 * | 7/2009 | Holder | G01S 13/003 342/453 |
| 2011/0074620 | A1 * | 3/2011 | Wintermantel | G01S 7/0233 342/70 |
| 2011/0074621 | A1 * | 3/2011 | Wintermantel | H01Q 1/3233 342/70 |
| 2011/0080314 | A1 * | 4/2011 | Wintermantel | H01Q 9/0407 342/147 |
| 2012/0068882 | A1 * | 3/2012 | Blachford | H01Q 3/2605 342/104 |
| 2014/0111379 | A1 * | 4/2014 | Schelten | G01S 5/04 342/385 |
| 2014/0253368 | A1 * | 9/2014 | Holder | G01S 13/003 342/146 |
| 2015/0133173 | A1 * | 5/2015 | Edge | G01S 5/08 455/456.6 |
| 2015/0138012 | A1 | 5/2015 | Ando | |
| 2015/0198701 | A1 | 7/2015 | Dolgin | |
| 2016/0187466 | A1 * | 6/2016 | Kim | G01S 13/931 342/59 |
| 2016/0299215 | A1 | 10/2016 | Dandu et al. | |
| 2016/0363648 | A1 * | 12/2016 | Mindell | G01S 7/003 |
| 2017/0031013 | A1 * | 2/2017 | Halbert | G01S 7/414 |
| 2017/0276769 | A1 * | 9/2017 | Kishigami | G01S 7/0234 |
| 2019/0204432 | A1 * | 7/2019 | Safaripour | G01S 7/282 |
| 2020/0256979 | A1 * | 8/2020 | Savchenkov | G01S 13/9011 |
| 2020/0371209 | A1 * | 11/2020 | Liu | G01S 7/4815 |
| 2021/0003664 | A1 * | 1/2021 | Davis | G01S 13/931 |

FOREIGN PATENT DOCUMENTS

| | | | | |
|---|---|---|---|---|
| WO | WO-2005098471 | A2 | 10/2005 | |
| WO | WO-2012147284 | A1 * | 11/2012 | ............. G01S 15/42 |
| WO | WO-2017030373 | A1 * | 2/2017 | ............. G01S 11/00 |
| WO | WO2019/136303 | A1 | 7/2019 | |
| WO | WO-2019136303 | A1 * | 7/2019 | ............. G01S 13/48 |

OTHER PUBLICATIONS

International Preliminary Report on Patentability dated Jul. 16, 2020 in PCT/US2019/012419.
WIPO Application No. PCT/US2019/012419, PCT International Search Report and Written Opinion of the International Searching Authority mailed Apr. 3, 2019.
CN Office Action dated Dec. 19, 2023 in CN Application No. 201980007336.1, with English Translation.

* cited by examiner

THREE-DIMENSIONAL AND FOUR-DIMENSIONAL MAPPING OF SPACE USING MICROWAVE AND MM-WAVE PARALLAX

CROSS REFERENCE TO RELATED APPLICATIONS

The present application claims benefit under 35 USC 119(e) of U.S. Application Ser. No. 62/613,704, filed Jan. 4, 2018, the content of which is incorporated herein by reference in its entirety.

FIELD OF THE INVENTION

The present invention relates to location determination using radio frequency signals.

BACKGROUND OF THE INVENTION

Determining the location and rate of movement of an object within a limited area can benefit a broad range of applications, such as gaming, human machine interface, security, environment awareness, health systems, wireless power transfer, hospitality, and the like. Three dimensional (3D) maps of various entities within an area (for example a room) can be done by determining the distance from an object to a source at different directions.

In a four-dimensional (4D) imaging system, in addition to location information, additional information about the various targets, such as their speed and direction of movement is also obtained. In standard lidar and radar solutions, the distance from the signal source to a remote target is measured by evaluating the time of flight, i.e., the time it takes for the signal to reach the target and travel back to the source of the signal. Therefore, a timing marker on the probing signal is required to enable such measurement. This can be performed as a pulse radar (i.e. amplitude modulation of the radar signal) where a short pulse of radio-frequency signal is transmitted toward the target and its time of flight is measured.

Frequency-modulated continuous-wave (FM-CW) radars and phase-modulated continuous-wave (PM-CW) radars may also be used to determine the distance (range) by evaluating the difference between the frequency of reflected and transmitted signals, when a chirp frequency that linearly increases with time is used as the transmit signal.

However, in such conventional methods, because the range resolution is mainly determined by the bandwidth of the transmitted signal, the modulated signal occupies a significant bandwidth. The bandwidth limitation affects the range resolution.

BRIEF SUMMARY OF THE INVENTION

A method of determining an object's distance, in accordance with one embodiment of the present invention, includes, in part, delivering a first RF signal from a first transmitter to the object, changing the direction of the first transmitter until the first transmitter reaches a first direction defined by a first angle at which the power of the first RF signal as reflected off the object and received by a receiver reaches a maximum value, delivering a second RF signal from a second transmitter to the object, changing the direction of the second transmitter until the second transmitter reaches a second direction defined by a second angle at which the power of the second RF signal as reflected off the object and received by the receiver reaches a maximum value, and determining the distance between the object and the first transmitter using the distance between the two transmitters, the second angle, and the difference between the first and second angles.

In one embodiment, the method further includes, in part, determining the distance between the object and the second transmitter using the distance between the two transmitters, the first angle, and the difference between the first and second angles.

In one embodiment, the method further includes, in part, determining the distance between the object and the receiver using the distance between the two transmitters, the first and second angles, the difference between the first and second angles, and the distance between the receiver and each of the first and second transmitters. In one embodiment, the first transmitter, the second transmitter and the receiver are positioned along a substantially straight line.

In one embodiment, the direction of the first transmitter is changed by mechanically rotating the transmitter. In one embodiment, the direction of the first transmitter is changed by changing the phases of a multitude of transmit/antenna elements of a phased array. In one embodiment, the direction of the first transmitter is changed by changing phases of a multitude of transmit/antenna elements of a first subarray of a phased array, and the direction of the second transmitter is changed by changing phases of a multitude of transmit/antenna elements of a second subarray of the phased array.

In one embodiment, the method further includes, in part, deactivating the second transmitter while delivering the first RF signal, and deactivating the first transmitter while delivering the second RF signal. In one embodiment, the receiver is a Doppler receiver adapted to detect a difference between the frequency of the first RF signal and the frequency of the RF signal as reflected by the object to determine the speed of the object.

A method of determining an object's distance, in accordance with one embodiment of the present invention, includes, in part, delivering an RF signal from a transmitter to the object, changing the direction of the first transmitter until the first transmitter reaches a first direction defined by a first angle at which the power of the RF signal as reflected off the object reaches a first maximum value at a first receiver, and at which the power of the RF signal as reflected off the object reaches a second maximum value at a second receiver, and determining the distance between the object and the transmitter using the distance between the transmitter and the first receiver, the distance between the transmitter and the second receiver, and the first angle.

In one embodiment, the first receiver, the second receiver and the transmitter are positioned along a substantially straight line. In one embodiment, the first receiver is positioned substantially near the transmitter. In one embodiment, the first and second receivers are Doppler receivers.

A method of determining an object's distance, in accordance with one embodiment of the present invention, includes, in part, delivering a first RF signal from a first transmitter to the object, changing the direction of the first transmitter along both azimuth and elevation until the first transmitter reaches a first direction defined by first and second angles at which the power of the first RF signal as reflected off the object and received by a receiver reaches a maximum value, delivering a second RF signal from a second transmitter to the object, changing the direction of the second transmitter along both azimuth and elevation until the second transmitter reaches a second direction defined by third and fourth angles at which the power of the second RF signal as reflected off the object and received by the receiver reaches a maximum value, and determining the distance between the object and the first transmitter using the distance between the two transmitters, and the first, second, third and fourth angles.

In one embodiment, the method further includes, in part, determining the distance between the object and the second transmitter using the distance between the two transmitters, and the first, second, third and fourth angles. In one embodiment, the method further includes, in part, determining the distance between the object and the receiver using the distance between the two transmitters, the distance between the first transmitter and the receiver, and the first, second, third and fourth angles.

In one embodiment, the first transmitter, the second transmitter and the receiver are positioned along a substantially straight line. In one embodiment, the method further includes, in part, deactivating the second transmitter while delivering the first RF signal, and deactivating the first transmitter while delivering the second RF signal. In one embodiment, the receiver is a Doppler receiver.

A method of determining an object's distance, in accordance with one embodiment of the present invention, includes, in part, delivering a first RF signal from a transmitter to the object, changing the direction of the first transmitter until the first transmitter reaches a first direction defined by first and second angles at which angles the power of the first RF signal as reflected off the object reaches a first maximum value at a first receiver, and at which angles the power of the first RF signal as reflected off the object reaches a second maximum value at a second receiver, and determining the distance between the object and the transmitter using the distance between the transmitter and the first receiver, the distance between the transmitter and the second receiver, and the first and second angles.

A mapping system, in accordance with one embodiment of the present invention, includes, in part, a first transmitter adapted to deliver a first RF signal to an object, a second transmitter adapted to deliver a second RF signal to the object, a receiver, and a controller configured to change the direction of the first transmitter until the first transmitter reaches a first direction defined by a first angle at which the power of the first RF signal as reflected off the object and received by the receiver reaches a maximum value. The controller is further configured to change the direction of the second transmitter until the second transmitter reaches a second direction defined by a second angle at which the power second RF signal as reflected off the object and received by the receiver reaches a maximum value. The controller is further configured to determine the distance between the object and the first transmitter using the distance between the two transmitters, the second angle and the difference between the first and second angles.

In one embodiment, the controller is further configured to determine the distance between the object and the second transmitter using the distance between the two transmitters, the first angle, and the difference between the first and second angles.

In one embodiment, the controller is further configured to determine the distance between the object and the receiver using the distance between the two transmitters, the first and second angles, the difference between the first and second angles, and the distance between the receiver and each of the first and second transmitters.

In one embodiment, the first transmitter, the second transmitter, and the receiver are positioned along a substantially straight line. In one embodiment, the controller is further configured to change the direction of the first transmitter by mechanically rotating the transmitter. In one embodiment, the first transmitter is a phased array transmitter. In one embodiment, the first transmitter is a first subarray of a phased array transmitter, and the second transmitter is a second subarray of the phased array transmitter. In one embodiment, the controller is further configured to deactivate the second transmitter while the first transmitter delivers the first RF signal, and deactivate the first transmitter while the second transmitter delivers the second RF signal. In one embodiment, the receiver is a Doppler receiver.

A mapping system, in accordance with one embodiment of the present invention, includes, in part, a transmitter adapted to deliver a first RF signal to an object, first and second receivers, and a controller configured to change the direction of the first transmitter until the first transmitter reaches a first direction defined by a first angle at which the power of the RF signal as reflected off the object reaches a first maximum value at the first receiver, and at which the power of the RF signal as reflected off the object reaches a second maximum value at the second receiver. The controller is further configured to determine the distance between the object and the transmitter using the distance between the transmitter and the first receiver, the distance between the transmitter and the second receiver, and the first angle.

In one embodiment, the first receiver, the second receiver and the transmitter are positioned along a substantially straight line. In one embodiment, the first receiver is positioned substantially near said transmitter. In one embodiment, the first and second receivers are Doppler receivers.

A mapping system, in accordance with one embodiment of the present invention, includes, in part, a first transmitter adapted to deliver a first RF signal to an object, a second transmitter adapted to deliver a second RF signal to the object, a receiver, and a controller configured to change the direction of the first transmitter along both azimuth and elevation until the first transmitter reaches a first direction defined by first and second angles at which the power of the first RF signal as reflected off the object and received by the receiver reaches a maximum value. The controller is further configured to change the direction of the second transmitter along both azimuth and elevation until the second transmitter reaches a second direction defined by third and fourth angles at which the power of the reflected RF signal as reflected off the object and received by the receiver reaches a maximum value. The controller is further configured to determine the distance between the object and the first transmitter using the distance between the two transmitters, and the first, second, third and fourth angles.

In one embodiment, the controller is further configured to determine the distance between the object and the second transmitter using the distance between the two transmitters, and the first, second, third and fourth angles. In one embodiment, the controller is further configured to determine the distance between the object and the receiver using the distance between the two transmitters, the distance between the first transmitter and the receiver, and the first, second, third and fourth angles.

In one embodiment, the first transmitter, the second transmitter and the receiver are positioned along a substantially straight line. In one embodiment, the controller is further configured to deactivate the second transmitter while the first transmitter delivers the first RF signal, and deactivate the first transmitter while the second transmitter delivers the second RF signal. In one embodiment, the receiver is a Doppler receiver.

A mapping system, in accordance with one embodiment of the present invention, includes, in part, a transmitter adapted to deliver a RF signal to an object, first and second receivers, and a controller configured to change the direction of the first transmitter until the first transmitter reaches a first direction defined by first and second angles at which the power of the RF signal as reflected off the object reaches a first maximum value at the first receiver, and at which the power of the RF signal as reflected off the object reaches a second maximum value at the second receiver. The controller is further configured to determine the distance between the object and the transmitter using the distance between the transmitter and the first receiver, the distance between the transmitter and the second receiver, and the first and second angles.

DETAILED DESCRIPTION OF THE INVENTION

In accordance with one embodiment of the present invention, the range of stationary and moving objects are determined using continuous-wave radio frequency to form 3D and/or 4D maps while consuming minimal signal bandwidth. To achieve this, embodiments of the present invention use parallax, defined herein as the angular difference resulting from viewing an object from different lines of sight. In a 3D/4D mapping context and in its simplest case, the angular difference may be attained via a displacement either between at least two receivers (RX) that capture a reflected signal at two slightly different angles, or between at least two transmitters (TX) whose radiated signals arrive at the target at two slightly different angles.

Figure 1A:
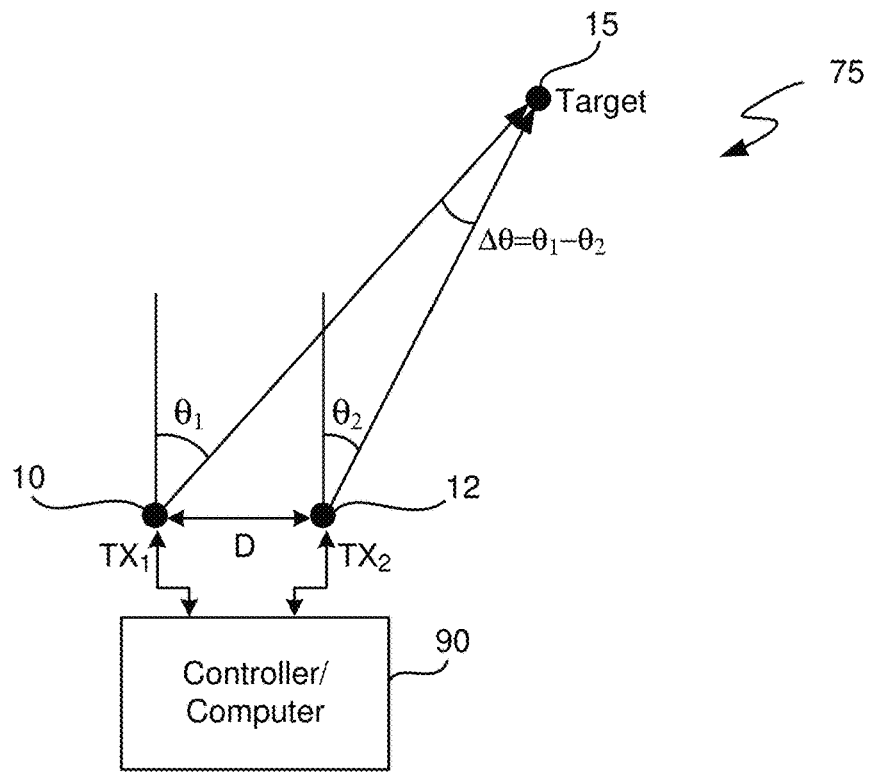
FIG. 1A shows mapping system, in accordance with one embodiment of the present invention.
Figure 1B:
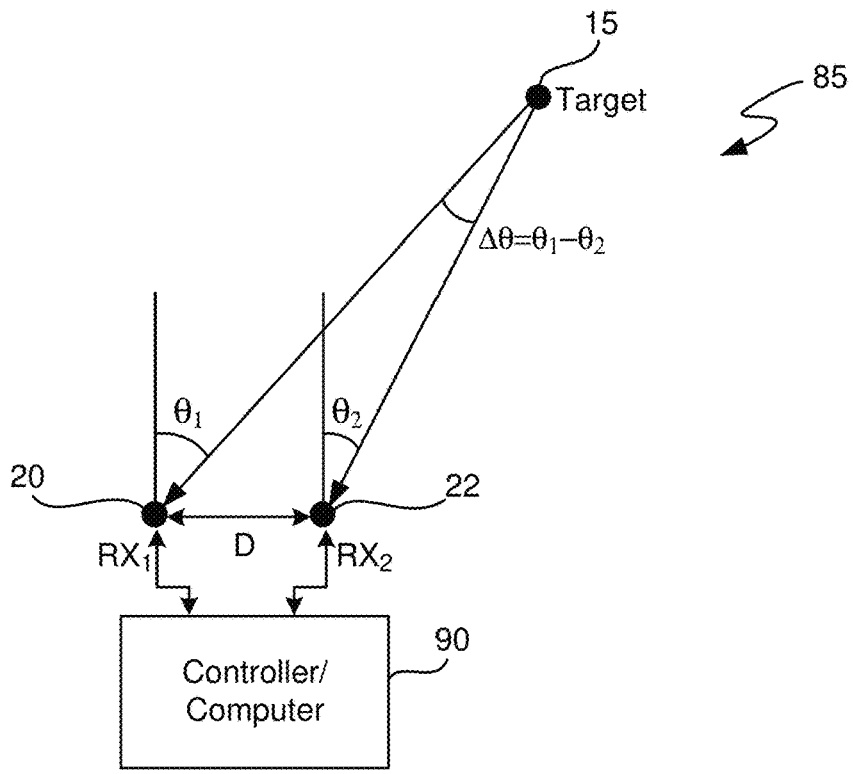
FIG. 1B shows a mapping system, in accordance with one embodiment of the present invention.

FIG. 1A shows a pair of transmitters 10 and 12 transmitting signals to target 15 at respective angels of $\theta_1$ and $\theta_2$ so as to determine the target 15's range, in accordance with one embodiment of the present invention and as described further below. FIG. 1B shows a pair of receivers 20 and 22 receiving signals from target 15 at respective angels of $\theta_1$ and $\theta_2$ in order to determine the target 15's range, in accordance with another embodiment of the present invention and as described further below. In both FIGS. 1A and 1B parallax is obtained by way of the separation between the transmitters and/or receivers causing the angular difference.

Figure 2:
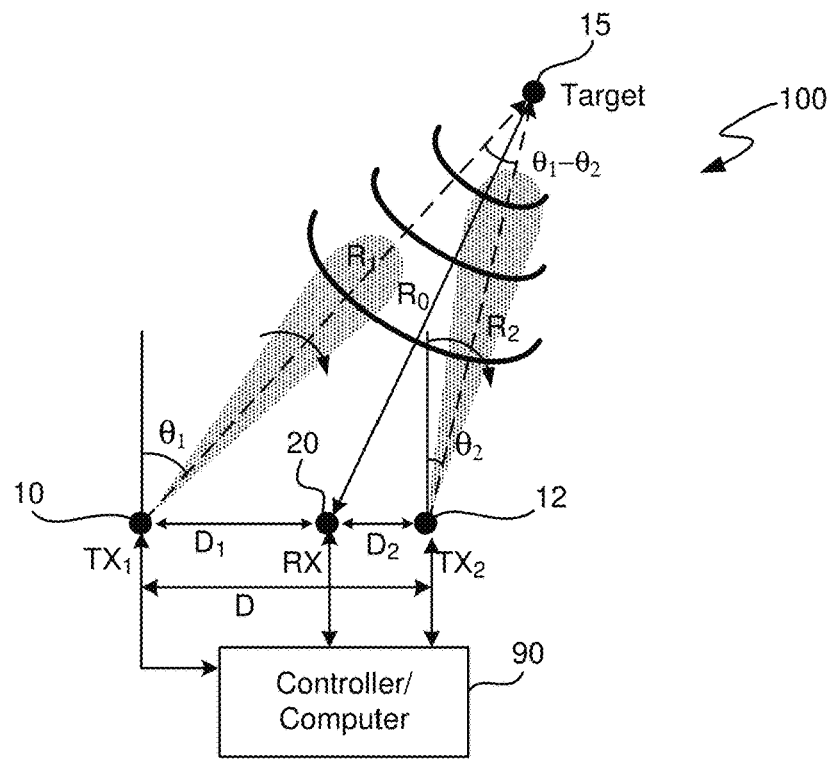
FIG. 2 shows a mapping system, in accordance with one embodiment of the present invention.

FIG. 2 shows a 3D/4D mapping system 100, in accordance with one exemplary embodiment of the present invention. Mapping system 100 is shown as including, in part, transmitters 10, 12, receiver 20 and controller/computer 90. Transmitters 10 and 12 may be components of a dual-beam transmitter/scanner that are spaced apart by a distance D. In the exemplary mapping system 100, receiver 20 is assumed to be positioned along a line connecting transmitters 10, 12 and positioned away from transmitters 10, 12 by respective distances of $D_1$ and $D_2$. Therefore, in FIG. 2, $D=D_1+D_2$. It is understood that embodiments of the present invention are not so limited and that in other embodiments, transmitters 10, 12 and receiver 50 may not be positioned on a straight line. Controller/computer 90 is configured, in part, to control the operation of the transmitters and receiver, and further to perform the computations described below to determine the range of target 15.

To determine the range of target 15 and generate a 3D/4D map, while one of the transmitters is activated to scan the environment, the other transmitter is deactivated. For example, when transmitter 10 is activated to scan the environment, transmitter 12 remains deactivated. Conversely, when transmitter 12 is activated to scan the environment, transmitter 10 is deactivated.

During an active scan by either of the two transmitters, the strength of the signal reflected by target 15 and captured (or received) by receiver 20 is at a maximum value when the active transmitter's beam is pointed toward the target. For example, assume transmitter 10 is activated to be in a scan mode so as to scan the environment, while transmitter 12 is off. The signal received by receiver 20 as a result of the reflection from target 15 reaches a maximum value when the beam radiated from transmitter 10 is pointed directly toward target 15. Therefore, in accordance with one aspect of the present invention, the beam direction $\theta_1$ of transmitter 10 giving rise to the maximum received signal by receiver 20 is used as one of the parameter in determining the range of target 15.

Similarly, the signal received by receiver 20—as a result of the reflection by target 15 of the signal transmitted by transmitter 12 when transmitter 10 is off—reaches a maximum value when the beam radiated from transmitter 12 is pointed directly toward target 15. The beam direction $\theta_2$ of transmitter 12 giving rise to the maximum received signal by receiver 20 is also used as a parameter in determining the range of target 15.

The two angles $\theta_1$ and $\theta_2$, obtained as described above, define the parallax angle $\Delta\theta=\theta_1-\theta_2$. Using the geometry of the arrangement, these two angles are then used to calculate the range of target 15 from transmitters 10, 12 and receiver 20, as described further below. Applying the law of sines to the triangle formed by transmitters 10, 12, and the target 15 yields the following:

$$\frac{R_1}{\sin\left(\frac{\pi}{2}+\theta_2\right)} = \frac{R_2}{\sin\left(\frac{\pi}{2}-\theta_1\right)} = \frac{D}{\sin\Delta\theta}$$

Distances $R_1$ and $R_2$, i.e. the range from transmitters 10, 12 to the target, respectively, are obtained as:

$$R_1 = \frac{D\cos\theta_2}{\sin\Delta\theta}$$

$$R_2 = \frac{D\cos\theta_1}{\sin\Delta\theta}$$

Knowing $R_1$ and $R_2$, distance $R_0$ between receiver 20 and target 15 is calculated by applying the law of cosines to either the triangle formed by receiver 20, transmitter 10 and target 15, or the triangle formed by receiver 20, transmitter 12 and target 15:

$$R_0^2 = D_1^2 + R_1^2 - 2D_1 R_1 \cos\left(\frac{\pi}{2}-\theta_1\right) = D_2^2 + R_2^2 - 2D_2 R_2 \cos\left(\frac{\pi}{2}+\theta_2\right)$$

Distance $R_0$ is thus determined as shown below:

$$R_0 = \sqrt{D_1^2 + \frac{D^2\cos^2\theta_2}{\sin^2\Delta\theta} - \frac{2D_1 D \cos\theta_2 \sin\theta_1}{\sin\Delta\theta}} = \sqrt{D_2^2 + \frac{D^2\cos^2\theta_1}{\sin^2\Delta\theta} + \frac{2D_2 D \cos\theta_1 \sin\theta_2}{\sin\Delta\theta}}$$

In one embodiment, target 15 is an active target that includes circuitry for receiving the RF signals transmitted by the transmitters 10, 12, and modulating and/or encoding the signal that target 15 subsequently transmits to receiver 20 to help determine the distances computed by the computer.

Referring to FIG. 1A, transmitters 10, 12 and controller/computer 90 form a mapping system 75, in accordance with another embodiment of the present invention. In such embodiments, target 15, which may be a smart phone or another mobile device, includes, among other components, power sensing circuitry adapted to sense the power level target 15 receives form the transmitters, and communication circuitry adapted to transmit to controller/computer 90 the power level sensed by target 15. Controller/computer 90 is configured, in part, to control the operation of the transmitters, perform the computations described below to determine the range of target 15, and receive information from target 15.

To determine the range of target 15 so as to generate a 3D/4D map, while one of the transmitters is activated to scan the environment, the other transmitter is deactivated. For example, when transmitter 10 is activated to scan the environment, transmitter 12 remains deactivated. Conversely, when transmitter 12 is activated to scan the environment, transmitter 10 is deactivated.

During an active scan by either of the two transmitters, the strength of the signal received by target (or mobile device) 15 is at a maximum value when the active transmitter's beam is pointed toward the target. For example, assume transmitter 10 is activated to be in a scan mode so as to scan the environment, while transmitter 12 is off. The signal received by target 15 reaches a maximum value when the beam radiated from transmitter 10 is pointed directly toward target 15. Target 15 is adapted to transmit the maximum power it receives from transmitter 10 when transmitter 10 is in a scan mode. Therefore, in accordance with one aspect of the present invention, the beam direction $\theta_1$ of transmitter 10 giving rise to the maximum received signal by target 15 is used as one of the parameter in determining the range of target 15.

Similarly, the signal received by target 15—as a result of the transmission by transmitter 12 when transmitter 10 is off—reaches a maximum value when the beam radiated from transmitter 12 is pointed directly toward target 15. Target 15 is adapted to transmit the maximum power it receives from transmitter 12 when transmitter 12 is in a scan mode. The beam direction $\theta_2$ of transmitter 12 giving rise to the maximum received signal by target 20 is also used as a parameter in determining the range of target 15.

The two angles $\theta_1$ and $\theta_2$, obtained as described above, define the parallax angle $\Delta\theta=\theta_1-\theta_2$. Using the geometry of the arrangement, these two angles are then used to calculate the range of target 15 from transmitters 10, 12, as described further below. Applying the law of sines to the triangle formed by transmitters 10, 12, and the target 15 yields the following:

$$\frac{R_1}{\sin\left(\frac{\pi}{2}+\theta_2\right)} = \frac{R_2}{\sin\left(\frac{\pi}{2}-\theta_1\right)} = \frac{D}{\sin\Delta\theta}$$

Distances $R_1$ and $R_2$, i.e. the range from transmitters 10, 12 to the target, respectively, are obtained as:

$$R_1 = \frac{D\cos\theta_2}{\sin\Delta\theta}$$

$$R_2 = \frac{D\cos\theta_1}{\sin\Delta\theta}$$

Figure 3A:
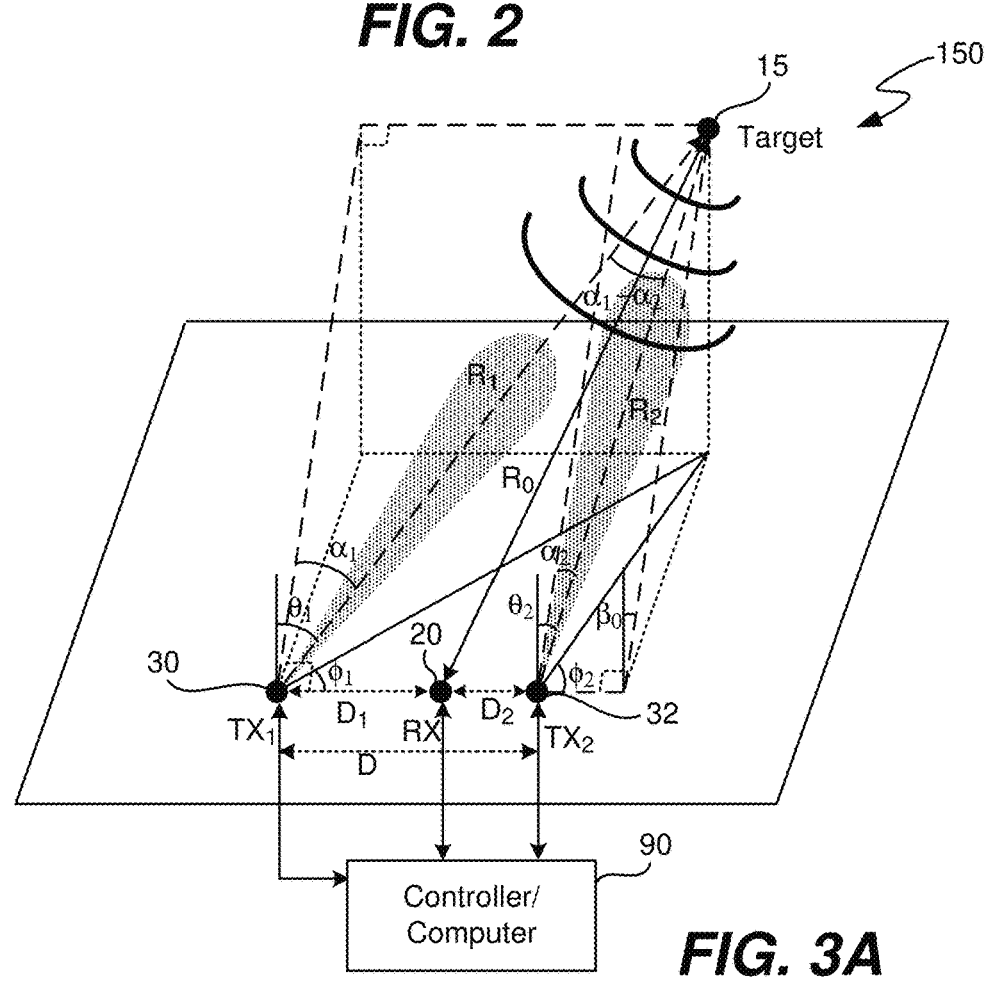
FIG. 3A shows a mapping system, in accordance with one embodiment of the present invention.

FIG. 3A shows a 3D/4D mapping system 150, in accordance with another exemplary embodiment of the present invention. Mapping system 150 is shown as including, in part, a pair of two-dimensional transmitters 30, 32, a receiver 20, and a controller/computer 90. In the exemplary mapping system 150, receiver 20 is assumed to be positioned along a line connecting transmitters 30, 32 and positioned away from transmitters 30, 32 by respective distances of $D_1$ and $D_2$. Therefore, in FIG. 3, $D=D_1+D_2$. It is understood that embodiments of the present invention are not so limited and that in other embodiments, transmitters 30, 32 and receiver 20 may not be positioned along a straight line. Controller/computer 90 is configured, in part, to control the operation of the transmitters and receiver, and further to perform the computations described below to determine the range of target 15.

To determine the range of target 15 and generate a 3D/4D map, while one of the transmitters is activated to scan the environment, the other transmitter is deactivated. The scanning of the environment by the transmitters is carried out in both elevation and azimuth directions. For example, when two-dimensional transmitter 30 is activated to scan the environment, transmitter 32 remains deactivated. Conversely, when transmitter 12 is activated to scan the environment, transmitter 10 is deactivated.

During an active scan by either of the transmitters, the strength of the signal reflected by target 15 and captured by receiver 20 is at a maximum value when the active transmitter's beam is pointed toward the target. For example, assume transmitter 30 is in a scan mode to scan the environment while transmitter 32 is off. The signal received by receiver 20 as a result of the reflection from target 15 reaches a maximum value when the beam radiated from transmitter 30 is directed at $\{\theta=\theta_1, \varphi=\varphi_1\}$, as shown. Similarly, the signal received by receiver 20 as a result of the reflection by target 15 of the signal transmitted by transmitter 32 when transmitter 30 is off, reaches a maximum value when the beam radiated from transmitter 32 is directed at $\{\theta=\theta_2, \varphi=\varphi_2\}$, as shown. Using these measured values and by taking advantage of the placement of the transmitters and receiver, values of $\sin \alpha_1$, $\cos \alpha_1$, $\sin \alpha_2$, $\cos \alpha_2$, and $\sin(\alpha_1-\alpha_2)$ may be calculated as shown below:

$$\sin\alpha_1 = \sin\theta_1\cos\varphi_1, \cos\alpha_1 = \sqrt{1-\sin^2\alpha_1} = \sqrt{\cos^2\theta_1 + \sin^2\theta_1\sin^2\varphi_1},$$

$$-\frac{\pi}{2} \leq \alpha_1 \leq \frac{\pi}{2}$$

$$\sin\alpha_2 = \sin\theta_2\cos\varphi_2, \cos\alpha_2 = \sqrt{1-\sin^2\alpha_2} = \sqrt{\cos^2\theta_2 + \sin^2\theta_2\sin^2\varphi_2},$$

$$-\frac{\pi}{2} \leq \alpha_2 \leq \frac{\pi}{2}$$

$$\sin(\alpha_1 - \alpha_2) =$$

$$\sin\theta_1\cos\varphi_1\sqrt{\cos^2\theta_2 + \sin^2\theta_2\sin^2\varphi_2} - \sin\theta_2\cos\varphi_2\sqrt{\cos^2\theta_1 + \sin^2\theta_1\sin^2\varphi_1}$$

Therefore, distances $R_1$, $R_2$ and $R_0$ may be determined using the following expressions:

$$R_1 = \frac{D\cos\alpha_2}{\sin(\alpha_1 - \alpha_2)}$$

$$R_2 = \frac{D\cos\alpha_1}{\sin(\alpha_1 - \alpha_2)}$$

$$R_0 = \sqrt{D_1^2 + \frac{D^2\cos^2\alpha_2}{\sin^2(\alpha_1 - \alpha_2)} - \frac{2D_1 D\cos\alpha_2\sin\alpha_1}{\sin(\alpha_1 - \alpha_2)}}$$

In one embodiment, target 15 is an active target that includes circuitry for receiving the RF signals transmitted by the transmitters 30, 32, and modulating and/or encoding the signal that target 15 subsequently transmits to receiver 20 to help determine the distances computed by the computer.

Figure 3B:
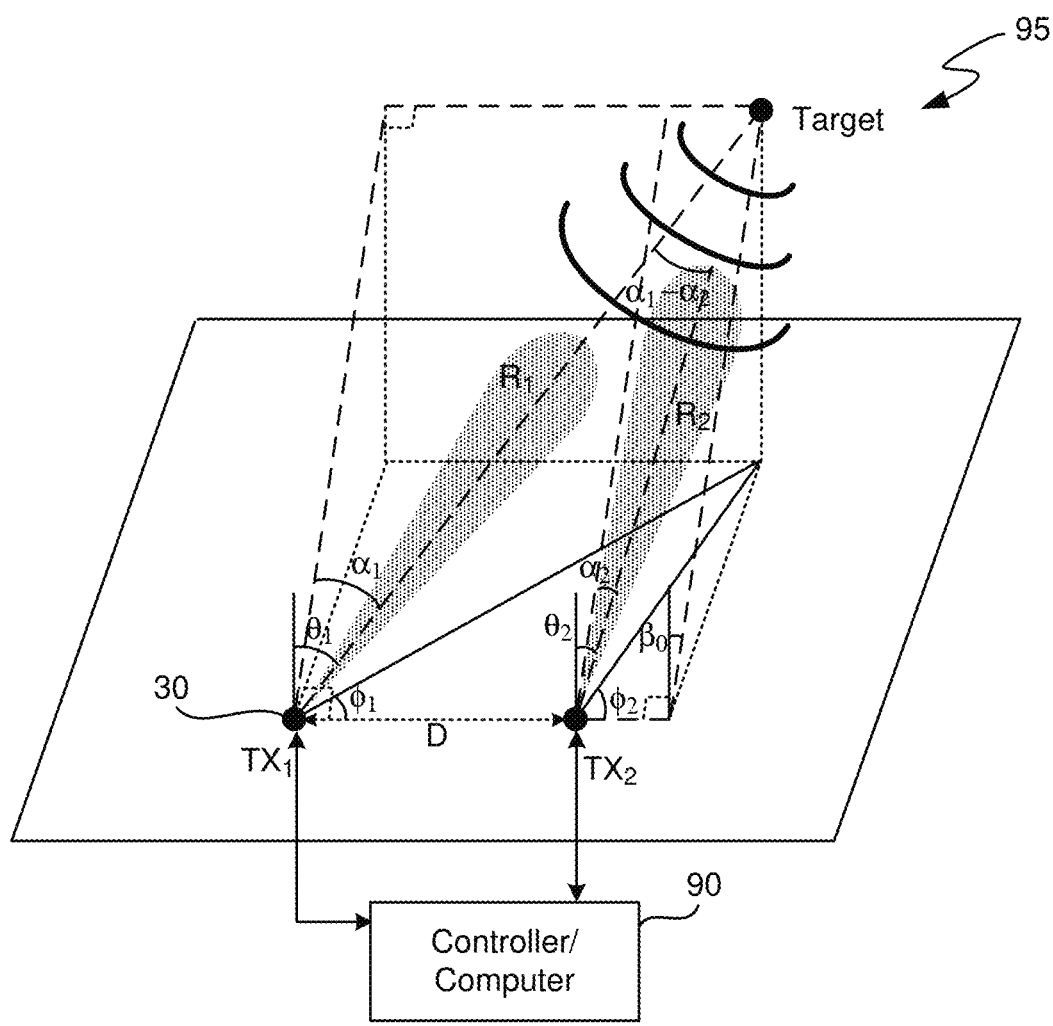
FIG. 3B shows a mapping system, in accordance with one embodiment of the present invention.

FIG. 3B shows a 3D/4D mapping system 95, in accordance with another exemplary embodiment of the present invention. Mapping system 95 is shown as including, in part, a pair of two-dimensional transmitters 30, 32, and a controller/computer 90. In such embodiments, target 15, which may be a smart phone or another mobile device, includes, among other components, power sensing circuitry adapted to sense the power level target 15 receives form the transmitters, and communication circuitry adapted to transmit to controller/computer 90 the power level sensed by target 15. Controller/computer 90 is configured, in part, to control the operation of the transmitters, perform the computations described below to determine the range of target 15, and receive information from target 15.

To determine the range of target 15 and generate a 3D/4D map, while one of the transmitters is activated to scan the environment, the other transmitter is deactivated. The scanning of the environment by the transmitters is carried out in both elevation and azimuth directions. For example, when two-dimensional transmitter 30 is activated to scan the environment, transmitter 32 remains deactivated. Conversely, when transmitter 12 is activated to scan the environment, transmitter 10 is deactivated.

During an active scan by either of the transmitters, the strength of the signal reflected by target 15 is at a maximum value when the active transmitter's beam is pointed toward the target. For example, assume transmitter 30 is in a scan mode to scan the environment while transmitter 32 is off. The signal received by target 15 reaches a maximum value when the beam radiated from transmitter 30 is directed at $\{\theta=\theta_1, \varphi=\varphi_1\}$, as shown. Target 15 is adapted to transmit the maximum power it receives from transmitter 30 while transmitter 30 is in a scan mode. Similarly, the signal received by target 15 reaches a maximum value when the beam radiated from transmitter 32 is directed at $\{\theta=\theta_2, \varphi=\varphi_2\}$, as shown. Target 15 is adapted to transmit the maximum power it receives from transmitter 32 while transmitter 32 is in a scan mode. Therefore the direction of the beam radiated by transmitter 30 and defined by angles $\{\theta=\theta_1, \varphi=\varphi_1\}$, and which corresponds to the maximum power received by target 15 and communicated back to transmitter 30 is determined. Similarly, the direction of the beam radiated by transmitter 32 and defined by angles $\{\theta=\theta_2, \varphi=\varphi_2\}$, and which corresponds to the maximum power received by target 15 and communicated back to transmitter 32 is determined. Using these measured values and by taking advantage of the placement of the transmitters, values of $\sin \alpha_1$, $\cos \alpha_1$, $\sin \alpha_2$, $\cos \alpha_2$, and $\sin(\alpha_1-\alpha_2)$ may be calculated as shown below:

$$\sin\alpha_1 = \sin\theta_1\cos\varphi_1, \cos\alpha_1 = \sqrt{1-\sin^2\alpha_1} = \sqrt{\cos^2\theta_1 + \sin^2\theta_1\sin^2\varphi_1},$$

$$-\frac{\pi}{2} \leq \alpha_1 \leq \frac{\pi}{2}$$

$$\sin\alpha_2 = \sin\theta_2\cos\varphi_2, \cos\alpha_2 = \sqrt{1-\sin^2\alpha_2} = \sqrt{\cos^2\theta_2 + \sin^2\theta_2\sin^2\varphi_2},$$

$$-\frac{\pi}{2} \leq \alpha_2 \leq \frac{\pi}{2}$$

$$\sin(\alpha_1 - \alpha_2) =$$

$$\sin\theta_1\cos\varphi_1\sqrt{\cos^2\theta_2 + \sin^2\theta_2\sin^2\varphi_2} - \sin\theta_2\cos\varphi_2\sqrt{\cos^2\theta_1 + \sin^2\theta_1\sin^2\varphi_1}$$

Therefore, distances $R_1$, $R_2$ and may be determined using the following expressions:

$$R_1 = \frac{D\cos\alpha_2}{\sin(\alpha_1 - \alpha_2)}$$

$$R_2 = \frac{D\cos\alpha_1}{\sin(\alpha_1 - \alpha_2)}$$

Figure 4:
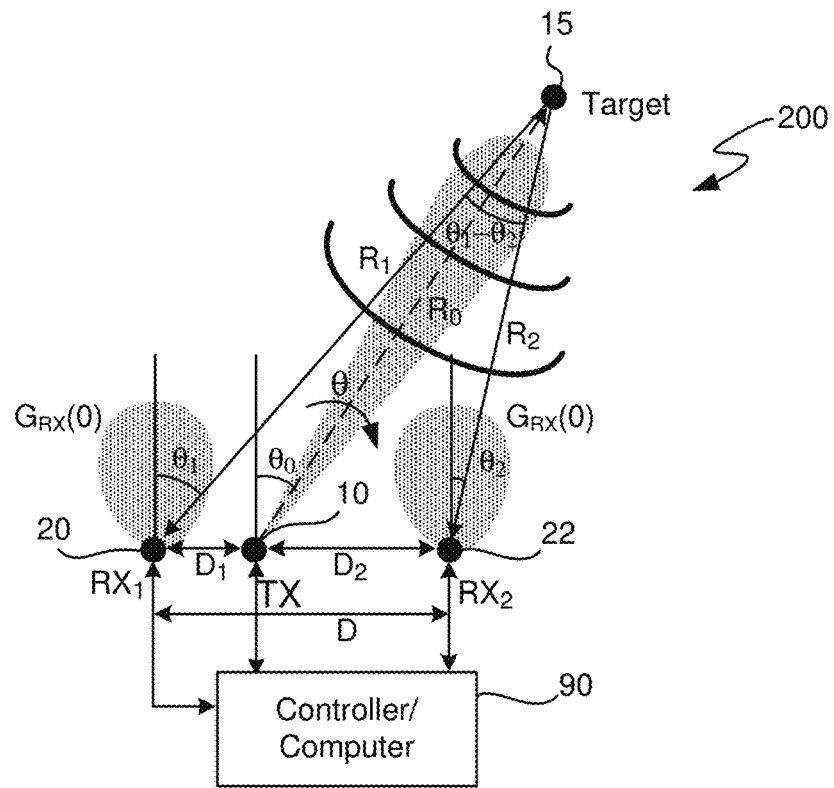
FIG. 4 shows a mapping system, in accordance with one embodiment of the present invention.

FIG. 4 shows a 3D/4D mapping system 200, in accordance with another exemplary embodiment of the present invention. Mapping system 200 is shown as including, in part, a transmitter 10, receivers 20, 22, and controller/computer 90. In the exemplary mapping system 200, transmitter 10 is assumed to be positioned along a line connecting receivers 20, 22 and positioned away from receivers 20, 22 by respective distances of $D_1$ and $D_2$. Therefore, in FIG. 4, $D=D_1+D_2$. It is understood that embodiments of the present invention are not so limited and that in other embodiments, transmitter 10 and receivers 20, 22 may not be positioned on a straight line. Controller/computer 90 is configured, in part, to control the operation of the transmitter and receivers, and further to perform the computations described below to determine the range of target 15.

To determine the range of target 15, as transmitter 10 scans the area by sweeping the angle θ, the signals received by receivers 20 and 22 both reach maximum values when angle θ reaches a specific value shown in FIG. 4 as $\theta_0$. The scan determines the angular direction of the target, however, the signal reflections from target 15 arrive at slightly different angles at the two receivers, namely angle $\theta_1$ associated with receiver 20, and angle $\theta_2$ associated with receiver 22. Assuming both receivers 20 and 22 have similar gain patterns, $G_{RX}(\theta)$, the difference in the angle and range may be calculated by the difference in the signal strength received by the two receivers. Using the well-known radar equations, the measured signal power at receiver unit 20, namely $P_{RX_1}$, and the measured signal power at receiver unit 22, namely $P_{RX_2}$, may be defined as shown below:

$$P_{RX_1} = \frac{P_{TX} G_{TX}(\theta_0) G_{RX}(\theta_1) \lambda^2 \sigma(\theta_1)}{(4\pi)^3 R_0^2 R_1^2}$$

$$P_{RX_2} = \frac{P_{TX} G_{TX}(\theta_0) G_{RX}(\theta_2) \lambda^2 \sigma(\theta_2)}{(4\pi)^3 R_0^2 R_2^2}$$

where $P_{TX}$ represents the power of the signal transmitted by transmitter 10, $G_{TX}(\theta)$ represents the gain pattern of the transmitter 10 antenna, and $\sigma(\theta)$ represents the radar cross-section of target 15.

Assuming, $R_0 \gg D$, then both $\theta_1$ and $\theta_2$ may be approximated by $\theta_0$, and $\sigma(\theta_1) = \sigma(\theta_2) = \sigma(\theta_0)$. Due to the arrangement of the receivers, transmitter and the target shown in FIG. 4, it is seen that $R_0 \cos\theta_0 = R_1 \cos\theta_1 = R_2 \cos\theta_2$. Hence, parameters $P_{RX_1}$ and $P_{RX_2}$ may be defined as:

$$P_{RX_1} = \frac{P_{TX}\lambda^2}{(4\pi)^3} \cdot \frac{\sigma(\theta_0) G_{TX}(\theta_0)}{R_0^4 \cos^2\theta_0} \cdot G_{RX}(\theta_1) \cos^2\theta_1$$

$$P_{RX_2} = \frac{P_{TX}\lambda^2}{(4\pi)^3} \cdot \frac{\sigma(\theta_0) G_{TX}(\theta_0)}{R_0^4 \cos^2\theta_0} \cdot G_{RX}(\theta_2) \cos^2\theta_2$$

By using Taylor expansion of $G_{RX}(\theta) \cos^2\theta$ around $\theta = \theta_0$, the following is achieved:

$$\begin{cases} P_{RX_1} \approx \frac{P_{TX}\lambda^2}{(4\pi)^3} \cdot \frac{\sigma(\theta_0) G_{TX}(\theta_0)}{R_0^4 \cos^2\theta_0} \cdot \{G_{RX}(\theta_0)\cos^2\theta_0 + \\ \qquad \left[\frac{dG_{RX}}{d\theta}(\theta_0)\cos^2\theta_0 - G_{RX}(\theta_0)\sin(2\theta_0)\right](\theta_1 - \theta_0)\} \\ P_{RX_2} \approx \frac{P_{TX}\lambda^2}{(4\pi)^3} \cdot \frac{\sigma(\theta_0) G_{TX}(\theta_0)}{R_0^4 \cos^2\theta_0} \cdot \{G_{RX}(\theta_0)\cos^2\theta_0 + \\ \qquad \left[\frac{dG_{RX}}{d\theta}(\theta_0)\cos^2\theta_0 - G_{RX}(\theta_0)\sin(2\theta_0)\right](\theta_2 - \theta_0)\} \end{cases}$$

Therefore, the difference between the two received signals $P_{RX_1}$ and $P_{RX_2}$ may be defined as:

$$P_{RX_1} - P_{RX_2} =$$
$$\frac{P_{TX}\lambda^2}{(4\pi)^3} \cdot \frac{\sigma(\theta_0) G_{TX}(\theta_0)}{R_0^4 \cos^2\theta_0} \cdot \left[\frac{dG_{RX}}{d\theta}(\theta_0)\cos^2\theta_0 - G_{RX}(\theta_0)\sin(2\theta_0)\right](\theta_1 - \theta_2)$$

The average of the two received signals $P_{RX_1}$ and $P_{RX_1}$ is defined as:

$$\frac{P_{RX_1} + P_{RX_2}}{2} =$$
$$P_0 + \frac{P_{TX}\lambda^2}{(4\pi)^3} \cdot \frac{\sigma(\theta_0) G_{TX}(\theta_0)}{R_0^4 \cos^2\theta_0} \cdot \left[\frac{dG_{RX}}{d\theta}(\theta_0)\cos^2\theta_0 - G_{RX}(\theta_0)\sin(2\theta_0)\right]$$
$$\left(\frac{\theta_1 + \theta_2}{2} - \theta_0\right)$$

In the immediately above equation, $$P_0 = \frac{P_{TX}\lambda^2}{(4\pi)^3} \cdot \frac{\sigma(\theta_0) G_{TX}(\theta_0)}{R_0^4} \cdot G_{RX}(\theta_0)$$

represents the signal strength received by a hypothetical receiver positioned at the same location as transmitter 10.

Assuming that target 15 is positioned sufficient far from the mapping system such that condition ($R_0 \gg D$) is satisfied if $|D_1 - D_2| \ll D$ then $(\theta_1 - \theta_0) \approx (\theta_0 - \theta_2)$, as a consequence of which the following expression is obtained:

$$(P_{RX_1} + P_{RX_2})/2 \approx P_0$$

Therefore, by dividing the difference $(P_{RX_1} - P_{RX_2})$ of the two measured signals by the average $(P_{RX_1} + P_{RX_2})/2$ of these two signals, it is seen that:

$$\frac{(P_{RX_1} - P_{RX_2})}{(P_{RX_1} + P_{RX_2})/2} \approx \frac{P_{RX_1} - P_{RX_2}}{P_0} =$$
$$\frac{\left[\frac{dG_{RX}}{d\theta}(\theta_0)\cos^2\theta_0 - G_{RX}(\theta_0)\sin(2\theta_0)\right](\theta_1 - \theta_2)}{G_{RX}(\theta_0)\cos^2\theta_0}$$

where the only unknown is the parallax angle difference $\Delta\theta = \theta_1 - \theta_2$. Therefore, the above equation directly relates the measured power of the reflected signal received by the two receivers to the parallax angle. Accordingly, by determining $\Delta\theta$, the range $R_0$ of the target from transmitter 10 may be readily determined using the following:

$$R_0 = \frac{1}{2}\left((D_2 - D_1)\sin\theta_0 + \frac{D\cos\theta_0}{\tan\Delta\theta} + \sqrt{\left((D_2 - D_1)\sin\theta_0 + \frac{D\cos\theta_0}{\tan\Delta\theta}\right)^2 + 4D_1 D_2}\right)$$

If $D_1 = D_2 = D/2$, the above equation may be simplified to:

$$R_0 = \frac{D}{2}\left(\frac{\cos\theta_0}{\tan\Delta\theta} + \sqrt{1 + \frac{\cos^2\theta_0}{\tan^2\Delta\theta}}\right)$$

In one embodiment, target 15 is an active target that includes circuitry for receiving the RF signals transmitted by transmitter 10, and modulating and/or encoding the signal that target 15 subsequently transmits to receivers 20, 22 to help determine the distances computed by the computer.

Figure 5:
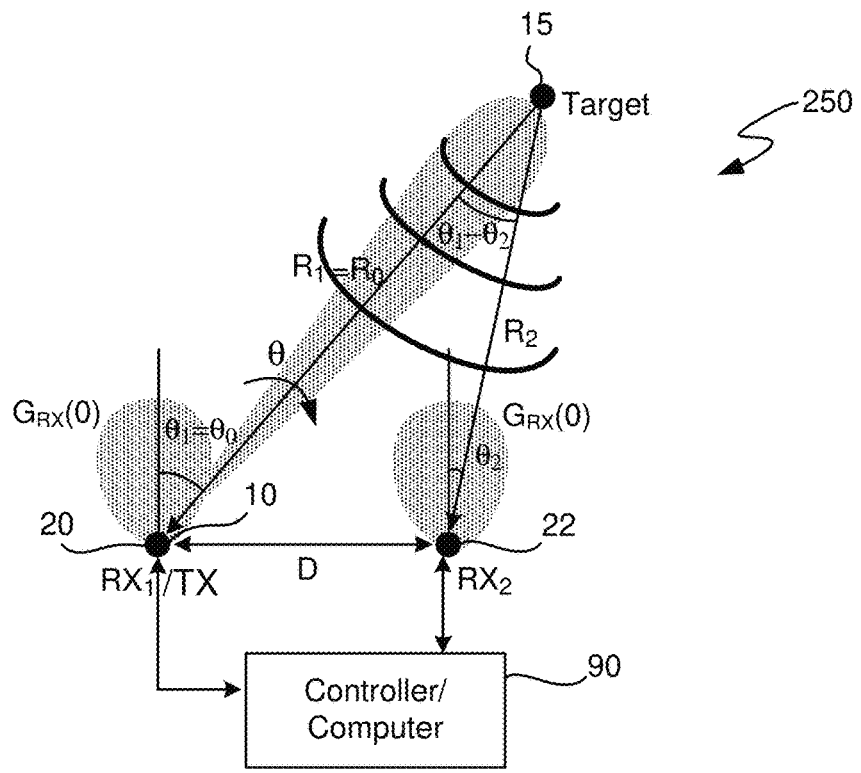
FIG. 5 shows a mapping system, in accordance with one embodiment of the present invention.

FIG. 5 shows a 3D/4D mapping system 250, in accordance with another exemplary embodiment of the present invention. Mapping system 250 is similar to mapping system 200 except that in mapping system 250 transmitter 10 and receiver 20 are placed substantially near the same point such that $D_1=0$ and $D_2=D$. As a result, in system 250 $\theta_1=\theta_0$ is known, while $\theta_2$ and the target range from transmitter 10 or receiver 20 ($R_1=R_0$) are the unknown parameters determined, by controller/computer 90, as shown below.

Parameter $P_0$, defined above, may be calculated as:

$$P_0 = P_{RX_1} = \frac{P_{TX}\lambda^2}{(4\pi)^3} \cdot \frac{\sigma(\theta_1)G_{TX}(\theta_1)}{R_1^4} \cdot G_{RX}(\theta_1).$$

Therefore $\theta_2$, and consequently $\Delta\theta=\theta_1-\theta_2$, may be calculated as shown below:

$$\frac{P_{RX_1} - P_{RX_2}}{P_{RX_1}} = \frac{\left[\frac{dG_{RX}}{d\theta}(\theta_1)\cos^2\theta_1 - G_{RX}(\theta_1)\sin(2\theta_1)\right](\theta_1 - \theta_2)}{G_{RX}(\theta_1)\cos^2\theta_1}$$

Accordingly, the range, $R_1=R_0$, may be obtained as shown below:

$$R_0 = R_1 = D\left(\sin\theta_0 + \frac{\cos\theta_0}{\tan\Delta\theta}\right).$$

Figure 6:
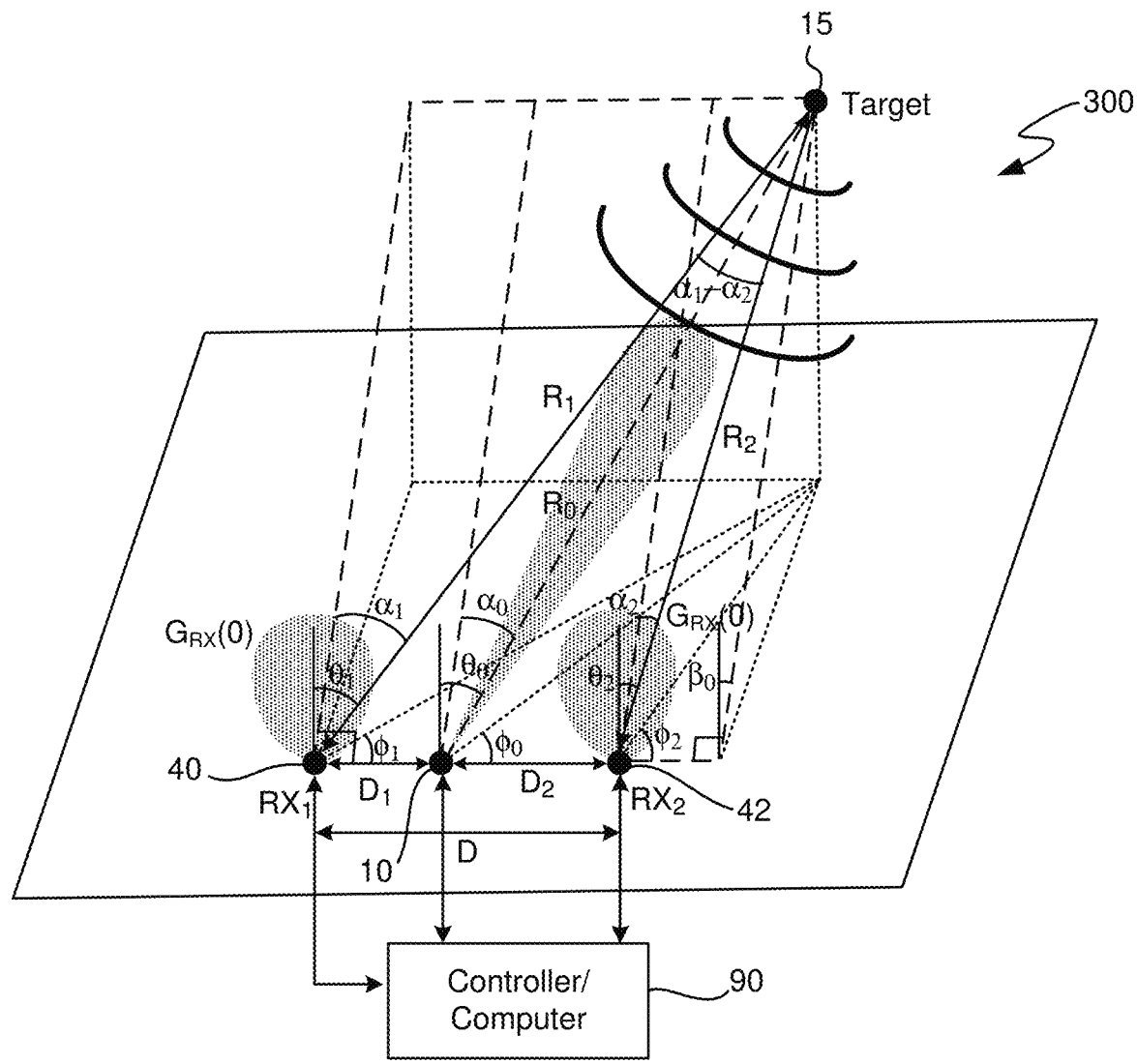
FIG. 6 shows a mapping system, in accordance with one embodiment of the present invention.

FIG. 6 shows a 3D/4D mapping system 300, in accordance with another exemplary embodiment of the present invention. Mapping system 300 is shown as including, in part, a pair of receivers 40, 42, a transmitter 10 adapted to change both azimuth and elevation (to enable scan in both $\theta$ and $\varphi$ directions), and a controller/computer 90. In the exemplary mapping system 300, transmitter 10 is assumed to be positioned along a line connecting receivers 40, 42 and positioned away from the receivers by respective distances of $D_1$ and $D_2$. Therefore, in FIG. 6, $D=D_1+D_2$. It is understood that embodiments of the present invention are not so limited and that in other embodiments, receivers 40, 42 and transmitter 10 may not be positioned along a straight line. Controller/computer 90 is configured, in part, to control the operation of the transmitter and receivers, and further to perform the computations described below to determine the range of target 15.

The signals received at receivers 40, 42, namely signals $P_{RX_1}$ and $P_{RX_2}$, are at maximum values when the beam radiated from transmitter 10 is pointed toward the target. Hence, as the transmitter is scanned in both $\theta$ and $\varphi$ directions, the received power levels at the receiver is recorded. The angles $\theta$ and $\varphi$ at which the power levels received at both receivers 40 and 42 attain their highest values correspond to angles $\theta_0$ and $\varphi_0$.

By transforming variables $\theta$ and $\varphi$ to new variables $\alpha$ and $\beta$, as shown in FIG. 6, the same procedure described above, may be used to achieve the parallax angle and, consequently, detect the range based on the received power levels of the reflected signals at the two receivers.

As is seen from FIG. 6:

$$\begin{cases} \sin\alpha_0 = \sin\theta_0\cos\varphi_0, & -\frac{\pi}{2} \leq \alpha_0 \leq \frac{\pi}{2} \\ \tan\beta_0 = \tan\theta_0\sin\varphi_0, & -\frac{\pi}{2} \leq \beta_0 \leq \frac{\pi}{2} \end{cases}$$

These equations may be used to transform the known gain pattern of the receiver units $G_{RX}(\theta,\varphi)$—defined in terms of angles $\theta,\varphi$—to a gain pattern $\hat{G}_{RX}(\alpha,\beta)$—defined in terms of angles $\alpha$ and $\beta$. Using this transformation, the following is obtained:

$$\frac{(P_{RX_1} - P_{RX_2})}{(P_{RX_1} + P_{RX_2})/2} \approx \frac{P_{RX_1} - P_{RX_2}}{P_0} = \frac{\left[\frac{d\hat{G}_{RX}}{d\alpha}(\alpha_0,\beta_0)\cos^2\alpha_0 - \hat{G}_{RX}(\alpha_0,\beta_0)\sin(2\alpha_0)\right](\alpha_1 - \alpha_2)}{\hat{G}_{RX}(\alpha_0,\beta_0)\cos^2\alpha_0}$$

This equation provides the parallax angle, $\Delta\alpha=\alpha_1-\alpha_2$, which in turn, provides the range, as shown below:

$$R_0 = \frac{1}{2}\Bigg((D_2 - D_1)\sin\alpha_0 + \frac{D\cos\alpha_0}{\tan\Delta\alpha} + \sqrt{\left((D_2-D_1)\sin\alpha_0 + \frac{D\cos\alpha_0}{\tan\Delta\alpha}\right)^2 + 4D_1D_2}\Bigg)$$

If transmitter 10 is placed at exactly the midpoint between receivers 40, 42, i.e., $D_1=D_2=D/2$, the above equations simplifies to:

$$R_0 = \frac{D}{2}\left(\frac{\cos\alpha_0}{\tan\Delta\alpha} + \sqrt{1 + \frac{\cos^2\alpha_0}{\tan^2\Delta\alpha}}\right).$$

In one embodiment, target 15 is an active target that includes circuitry for receiving the RF signals transmitted by transmitter 10, and modulating and/or encoding the signal that target 15 subsequently transmits to receivers 40, 42 to help determine the distances computed by the computer.

Figure 7:
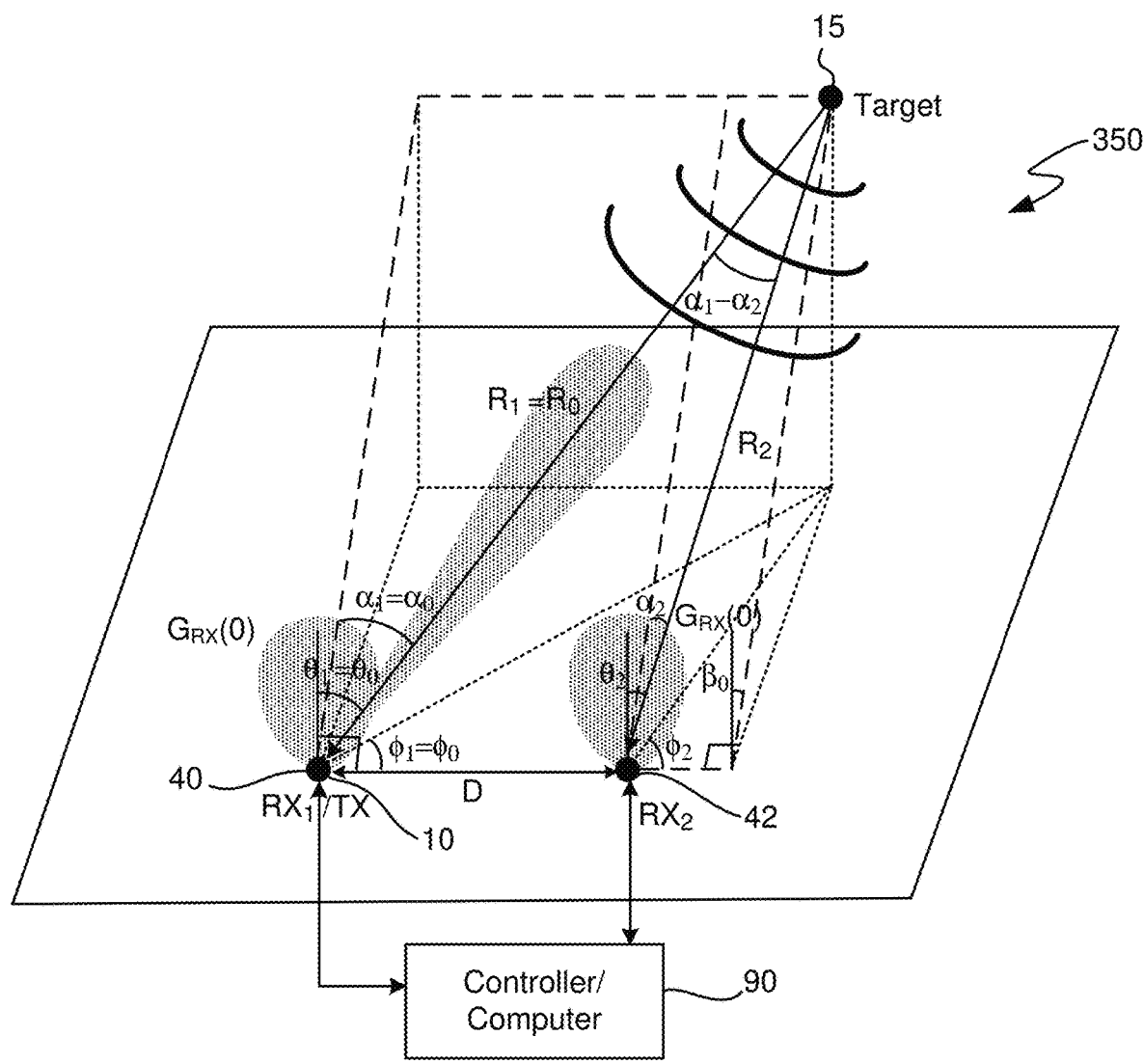
FIG. 7 shows a mapping system, in accordance with one embodiment of the present invention.

FIG. 7 shows a 3D/4D mapping system 350, in accordance with another exemplary embodiment of the present invention. Mapping system 350 is similar to mapping system 300 except that in mapping system 350, transmitter 10 and receiver 40 are positioned substantially near the same point, thus dispensing the need to approximate $P_0$. In mapping system 350, parameters $\Delta\alpha$ and $R_0$ may be calculated as shown below:

$$\frac{P_{RX_1} - P_{RX_2}}{P_{RX_1}} = \frac{\left[\frac{d\hat{G}_{RX}}{d\alpha}(\alpha_1,\beta_0)\cos^2\alpha_1 - \hat{G}_{RX}(\alpha_1,\beta_0)\sin(2\alpha_1)\right](\alpha_1 - \alpha_2)}{\hat{G}_{RX}(\alpha_1,\beta_0)\cos^2\alpha_1}$$

$$R_0 = R_1 = D\left(\sin\alpha_1 + \frac{\cos\alpha_1}{\tan\Delta\alpha}\right)$$

Conventional CW radars often use the Doppler shift to detect a moving target's radial velocity. Embodiments of the present invention, described above, may also be used to determine the range of moving objects by measuring the reflected signal while also detecting the velocity using the Doppler shift.

Figure 8:
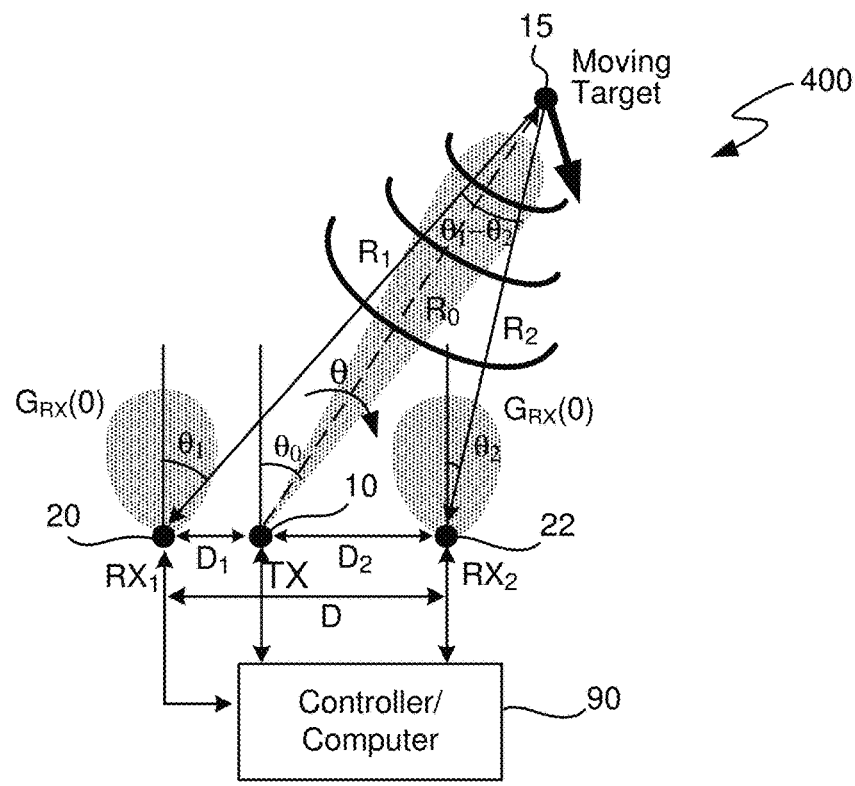
FIG. 8 shows a Doppler mapping system, in accordance with one embodiment of the present invention.

FIG. 8 shows a 3D/4D Doppler mapping system 400 adapted to detect the range of a moving target, in accordance with one exemplary embodiment of the present invention. Doppler mapping system 400 is shown as including, in part, Doppler receivers 20, 22, transmitter 10, and a controller/computer 90. For simplicity, the following description is provided with reference to the transmitter as being a one-dimensional transmitter/scanner. It is understood, however, that transmitter 10 may be a two-dimensional scanner, as described above. In the exemplary mapping system 400, transmitter 10 is assumed to be positioned along a line connecting receivers 20, 22 and positioned away from the receivers by respective distances of $D_1$ and $D_2$. Therefore, in FIG. 8, $D=D_1+D_2$. It is understood that embodiments of the present invention are not so limited and that in other embodiments, receivers 20, 22 and transmitter 10 may not be positioned along a straight line. Controller/computer 90 is configured, in part, to control the operation of the transmitter and receivers, and further to perform the computations described below to determine the range of target 15.

In a manner similar to embodiment 300 described above with reference to FIG. 6, the range of target 15 from the transmitter may be determined by first calculating the parallax angle through measuring the strength of the signals received by the Doppler receivers (referred to herein alternatively as Doppler signals) at the two receiving units using the following expression in which signals $P_{RX_1}$ and $P_{RX_2}$ respectively represent the power levels of the Doppler signals received by receivers 20, 22:

$$\frac{(P_{RX_1} - P_{RX_2})}{(P_{RX_1} + P_{RX_2})/2} \approx \frac{P_{RX_1} - P_{RX_2}}{P_0} =$$

$$\frac{\left[\frac{dG_{RX}}{d\theta}(\theta_0)\cos^2\theta_0 - G_{RX}(\theta_0)\sin(2\theta_0)\right](\theta_1 - \theta_2)}{G_{RX}(\theta_0)\cos^2\theta_0}$$

The range of the target from transmitter 10 may then be obtained using the following expression:

$$R_0 = \frac{1}{2}\left((D_2 - D_1)\sin\theta_0 + \frac{D\cos\theta_0}{\tan\Delta\theta} + \sqrt{\left((D_2 - D_1)\sin\theta_0 + \frac{D\cos\theta_0}{\tan\Delta\theta}\right)^2 + 4D_1D_2}\right)$$

In one embodiment, target 15 is an active target that includes circuitry for receiving the RF signals transmitted by transmitter 10, and modulating and/or encoding the signal that target 15 subsequently transmits to receivers 20, 22 to help determine the distances computed by the computer.

Figure 9:
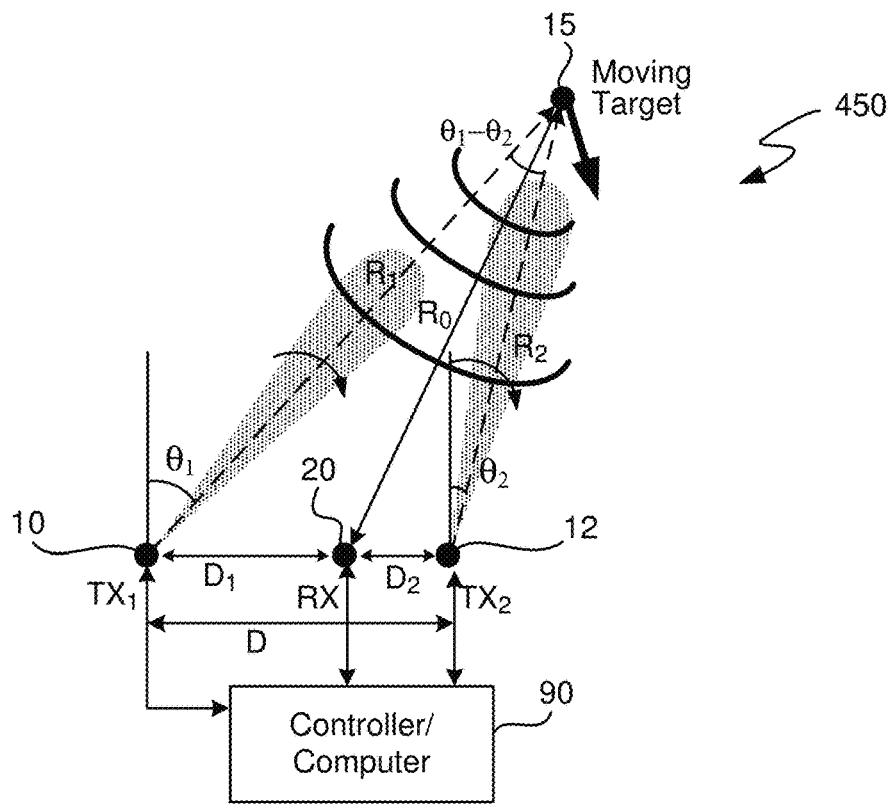
FIG. 9 shows a Doppler mapping system, in accordance with one embodiment of the present invention.

FIG. 9 shows a 3D/4D Doppler mapping system 450 adapted to detect the range of a moving target, in accordance with another exemplary embodiment of the present invention. Doppler mapping system 450 is shown as including, in part, transmitters 10, 12, Doppler receiver 20, and a controller/computer 90. For simplicity, the following description is provided with reference to transmitters 10, 12 each being a one dimensional transmitter/scanner and adapted to scan along one dimension. It is understood, however, that transmitters 10, 12 may be two-dimensional scanners, as described above. Furthermore, in the exemplary mapping system 450, receiver 20 is assumed to be positioned along a line connecting transmitters 10, 12 and positioned away from the receivers by respective distances of $D_1$ and $D_2$. Therefore, in FIG. 9, $D=D_1+D_2$. It is understood that embodiments of the present invention are not so limited and that in other embodiments, transmitters 10, 12 and receiver 20 may not be positioned along a straight line. Controller/computer 90 is configured, in part, to control the operation of the transmitter and receivers, and further to perform the computations described below to determine the range of target 15.

Each transmitter scans the area when the other transmitter is off and finds the direction at which the maximum Doppler signal is captured by the receiver, thereby to determine angles $\theta_1$ and $\theta_2$, as shown. The range may then be determined as shown below:

$$R_1 = \frac{D\cos\theta_2}{\sin\Delta\theta}$$

$$R_2 = \frac{D\cos\theta_1}{\sin\Delta\theta}$$

$$R_0 = \sqrt{D_1^2 + \frac{D^2\cos^2\theta_2}{\sin^2\Delta\theta} - \frac{2D_1D\cos\theta_2\sin\theta_1}{\sin\Delta\theta}}$$

In one embodiment, target 15 is an active target that includes circuitry for receiving the RF signals transmitted by transmitters 10, 12, and modulating and/or encoding the signal that target 15 subsequently transmits to receivers 20 to help determine the distances computed by the computer.

Figure 10A:
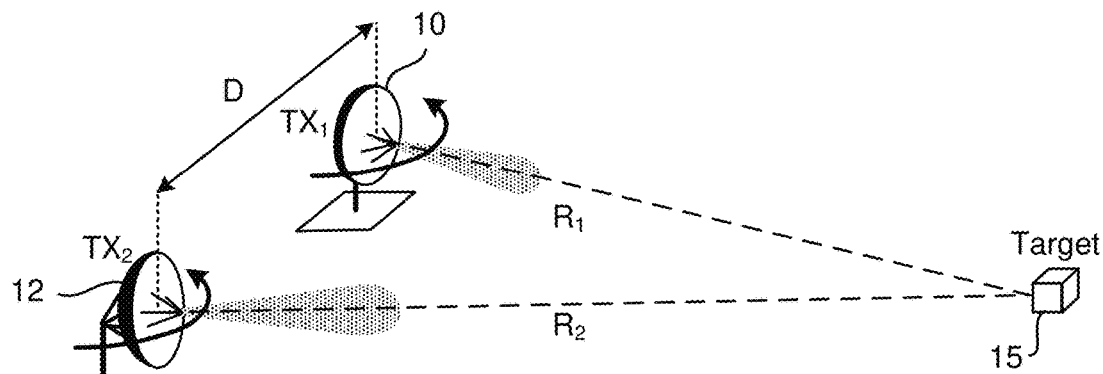
FIG. 10A shows a pair of transmitters transmitting signals to a target to determine the target's range, in accordance with one embodiment of the present invention.

Any number of techniques may be used to form a transmitter/scanner and implement the required displacement between two transmitter units. In one embodiment, shown in FIG. 10A, each transmitter/scanner may be a unit transmitter antenna which uses angle encoders to mechanically rotate and radiate its beam toward a specific direction and thus scan the desired area to determine the range of target 15. Two such transmitters/scanners 10, 12, may be placed physically apart by distance D to create a parallax, as shown in FIG. 10A.

Figure 10B:
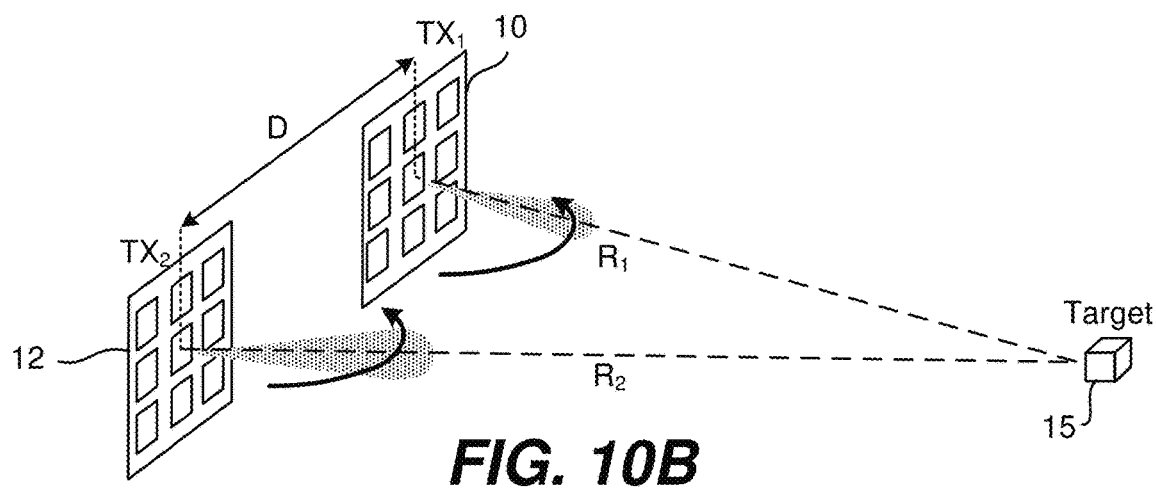
FIG. 10B shows a pair of phased arrays transmitting signals to a target to determine the target's range, in accordance with one embodiment of the present invention.

In another embodiment, each transmitter/scanner may be a phased array having multiple transmit elements/antennas which electronically controls the direction of the radiated beam by varying the relative phases of each antenna element to scan the entire desired area. FIG. 10B shows two phased arrays 10 and 12 each having a two-dimensional array of 3×3 transmit elements/antennas. The two phased arrays are physically spaced apart by a distance of D from their respective centers to create a parallax.

Figure 10C:
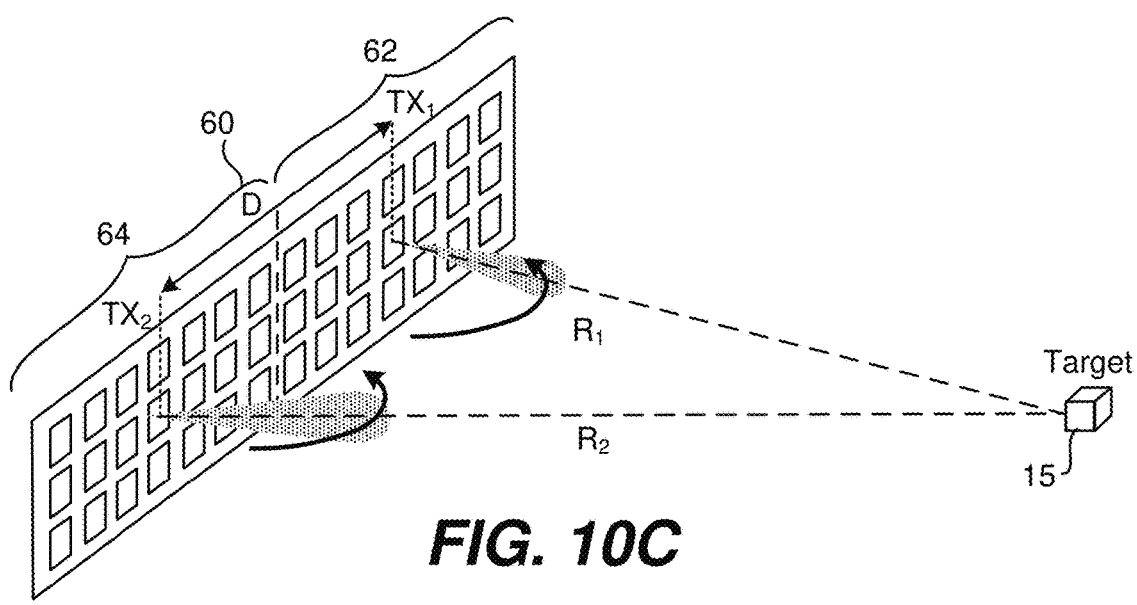
FIG. 10C shows a phased array transmitting signals to a target to determine the target's range, in accordance with one embodiment of the present invention

In accordance with yet another embodiment, each transmitter/scanner may be a sub-array of a phased array having multiple transmit elements/antennas. Each sub-array steers its beam electronically and independent of the other sub-array. The effective displacement required for parallax is equal to the distance between the centers of the sub-arrays. FIG. 10C shows an exemplary phased arrays 60 having a two-dimensional arrays of 3×14 transmit elements/antennas. Phased array 60 is shown as being divided into 2 subarrays, 62 and 64, each having a two-dimensional array of 3×7 transmit elements/antennas. The distance between the centers of the two subarrays is shown as being equal to D.

The above embodiments of the present invention are illustrative and not limitative. Other additions, subtractions or modifications are obvious in view of the present disclosure and are intended to fall within the scope of the appended claims.

What is claimed is:

1. A method of determining an object's distance, the method comprising:
    delivering a first RF signal from a first transmitter to the object;
    changing a direction of the first transmitter along both azimuth and elevation until the first transmitter reaches a first direction defined by first and second angles at which a power of a first reflected RF signal reflected off the object and received by a receiver reaches a maximum value;
    delivering a second RF signal from a second transmitter to the object;
    changing a direction of the second transmitter along both azimuth and elevation until the second transmitter reaches a second direction defined by third and fourth angles at which a power of a second reflected RF signal reflected off the object and received by the receiver reaches a maximum value;
    determining a distance between the object and the first transmitter in accordance with a distance between the two transmitters, and the first, second, third and fourth angles;
    deactivating the second transmitter while delivering the first RF signal from the first transmitter; and
    deactivating the first transmitter while delivering the second RF signal from the second transmitter.

2. The method of claim 1 further comprising:
    determining a distance between the object and the second transmitter in accordance with the distance between the two transmitters, and the first, second, third and fourth angles.

3. The method of claim 2 further comprising:
    determining a distance between the object and the receiver in accordance with the distance between the two transmitters, the distance between the first transmitter and the receiver, and the first, second, third and fourth angles.

4. The method 3 wherein said first transmitter, said second transmitter and said receiver are positioned along a substantially straight line.

5. The method of claim 1 wherein said receiver is a Doppler receiver.

6. A mapping system comprising:
    a first transmitter adapted to deliver a first RF signal to an object;
    a second transmitter adapted to deliver a second RF signal to the object;
    a receiver; and
    a controller configured to:
        change a direction of the first transmitter along both azimuth and elevation until the first transmitter reaches a first direction defined by first and second angles at which a power of a first reflected RF signal reflected off the object and received by the receiver reaches a maximum value;
        change a direction of the second transmitter along both azimuth and elevation until the second transmitter reaches a second direction defined by third and fourth angles at which a power of a second reflected RF signal reflected off the object and received by the receiver reaches a maximum value;
        determine a distance between the object and the first transmitter in accordance with a distance between the two transmitters, and the first, second, third and fourth angles;
        deactivate the second transmitter while the first transmitter delivers the first RF signal; and
        deactivate the first transmitter while the second transmitter delivers the second RF signal.

7. The mapping system of claim 6 wherein the controller is further configured to:
    determine a distance between the object and the second transmitter in accordance with the distance between the two transmitters, and the first, second, third and fourth angles.

8. The mapping system of claim 7 wherein the controller is further configured to:
    determine a distance between the object and the receiver in accordance with the distance between the two transmitters, the distance between the first transmitter and the receiver, and the first, second, third and fourth angles.

9. The mapping system 8 wherein said first transmitter, said second transmitter and said receiver are positioned along a substantially straight line.

10. The mapping system of claim 6 wherein said receiver is a Doppler receiver.

* * * * *